(12) United States Patent
Lorusso

(10) Patent No.: US 11,815,120 B2
(45) Date of Patent: Nov. 14, 2023

(54) QUICK-CONNECTION MOUNTING SYSTEM FOR THE AUTOMOTIVE SECTOR AND BOXES IN GENERAL

(71) Applicant: BAWER S.P.A., Matera (IT)

(72) Inventor: Pasquale Lorusso, Altamura (IT)

( * ) Notice: Subject to any disclaimer, the term of this patent is extended or adjusted under 35 U.S.C. 154(b) by 644 days.

(21) Appl. No.: 17/052,742

(22) PCT Filed: May 23, 2019

(86) PCT No.: PCT/IT2019/050115
§ 371 (c)(1),
(2) Date: Nov. 3, 2020

(87) PCT Pub. No.: WO2019/234776
PCT Pub. Date: Dec. 12, 2019

(65) Prior Publication Data
US 2021/0231153 A1    Jul. 29, 2021

(30) Foreign Application Priority Data

Jun. 8, 2018  (IT) .......................... 102018000006171

(51) Int. Cl.
*F16B 21/06* (2006.01)
*F16B 21/08* (2006.01)

(52) U.S. Cl.
CPC .......... *F16B 21/065* (2013.01); *F16B 21/086* (2013.01)

(58) Field of Classification Search
CPC ......... Y10T 403/7047; Y10T 403/7051; Y10T 403/7052; Y10T 403/7058; F16C 2226/16; F16B 21/06; F16B 21/065; F16B 21/07; F16B 21/071; F16B 21/076; F16B 21/078; F16B 21/08; F16B 21/086; F16B 21/088; B60R 11/06; B60R 2011/0049; B60R 2011/0071; B60R 2011/0078; B25H 3/02; B25H 5/00
See application file for complete search history.

(56) References Cited

U.S. PATENT DOCUMENTS

| 109,681 | A | * | 11/1870 | Smith | ...................... F16B 39/04 |
| | | | | | 403/360 |
| 738,445 | A | * | 9/1903 | Hoffman | ............... F16C 35/073 |
| | | | | | 301/130 |

(Continued)

FOREIGN PATENT DOCUMENTS

| CN | 201501351 U | 6/2010 |
| DE | 4218140 A1 | 1/1993 |

(Continued)

OTHER PUBLICATIONS

International Search Report for corresponding PCT/IT2019/050115, dated Sep. 26, 2019.

(Continued)

*Primary Examiner* — Jonathan P Masinick
(74) *Attorney, Agent, or Firm* — Egbert, McDaniel & Swartz, PLLC

(57) ABSTRACT

Disclosed is a mounting system of a box, of any shape or dimensions, to a static or dynamic structure. The system is particularly advantageous in the automotive sector, where it is necessary to optimize times and simplify the mounting of a box to a vehicle chassis.

7 Claims, 3 Drawing Sheets

(56) References Cited

U.S. PATENT DOCUMENTS

Figure 1:
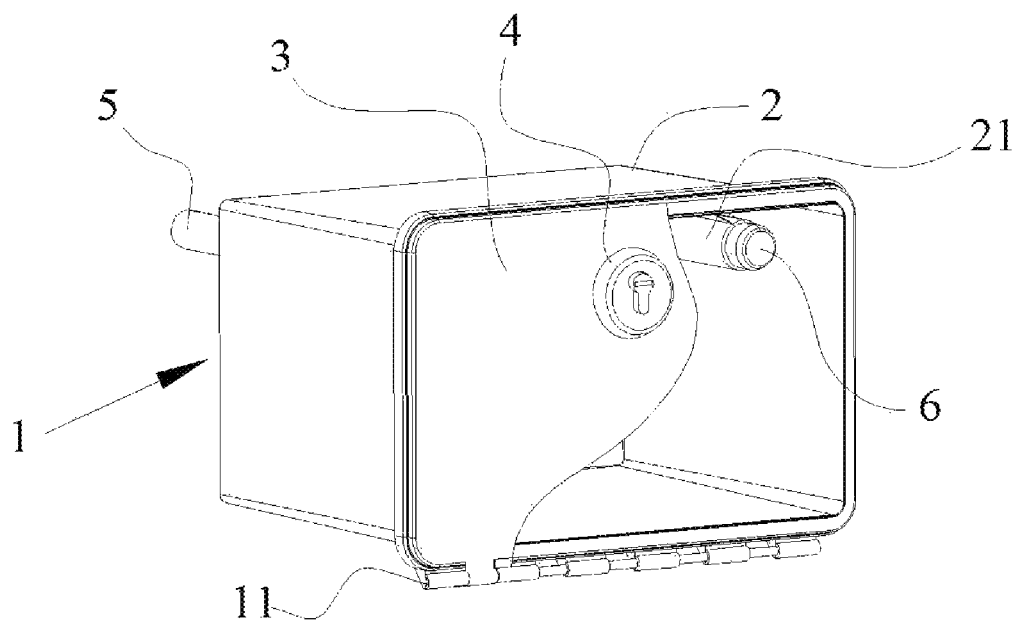

| | | | | |
|---|---|---|---|---|
| 2,294,398 | A | * | 9/1942 | Ferguson .............. F16G 11/048 52/223.13 |
| 2,946,611 | A | * | 7/1960 | Moyer ................. F16C 35/073 403/356 |
| 4,333,649 | A | * | 6/1982 | Vaughn ................ A63B 49/025 403/368 |
| 4,630,160 | A | * | 12/1986 | Murayama ............ B62K 19/48 455/90.3 |
| 6,626,480 | B2 | * | 9/2003 | Anderson ............... B60R 11/06 224/404 |
| 6,918,302 | B2 | * | 7/2005 | Yamada ................ F16C 35/077 73/660 |
| 9,688,214 | B1 | * | 6/2017 | Moore ..................... B25H 3/02 |
| 10,808,744 | B2 | * | 10/2020 | Porter ..................... B21J 15/04 |
| 10,821,912 | B1 | * | 11/2020 | Onuschak .............. B60R 11/06 |
| 11,292,400 | B2 | * | 4/2022 | Spencer ................. B60R 11/06 |
| 11,359,424 | B2 | * | 6/2022 | Li ............................ E05C 1/10 |

FOREIGN PATENT DOCUMENTS

| | | | | |
|---|---|---|---|---|
| DE | 202013104178 | U1 | * | 11/2013 .............. B25H 3/02 |
| DE | 102015218034 | A1 | * | 3/2017 |
| EP | 0639720 | | | 2/1995 |
| EP | 1442845 | A1 | | 8/2004 |
| EP | 3679844 | A1 | * | 7/2020 |
| FR | 2917349 | A1 | | 12/2008 |
| KR | 200412700 | Y1 | * | 3/2006 |
| KR | 20140126922 | A | * | 11/2014 |
| WO | WO-9214941 | A1 | * | 9/1992 .............. F16C 11/02 |

2017/0108025 A1   4/2017  Morgillo et al.

OTHER PUBLICATIONS

Written Opinion of the International Searching Authority for corresponding PCT/IT2019/050115, dated Sep. 26, 2019.

* cited by examiner

QUICK-CONNECTION MOUNTING SYSTEM FOR THE AUTOMOTIVE SECTOR AND BOXES IN GENERAL

The system according to the present invention, is related to the sector of toolboxes mounted in most industrial vehicles and toolboxes in general, intended for any use, which require a stable connection to a static or dynamic structure. More specifically, the invention relates to the connection system of said boxes, to a vehicle chassis or to a chassis in general.

As known, in industrial vehicles, but also in trucks, commercial vehicles, vans, tractors, trailers, semi-trailers, agricultural trailers, trailers and appendix carts, electric vehicles, campers, caravans, or more in general in all dynamic and static devices which need a container to store a series of tools of various nature, such as for example fire extinguishers, tools and anything else which may be helpful to the vehicle or to the place of installation, boxes of various capacity are mounted.

Said toolboxes, or boxes in general, typically made in thermoplastic material, in metal (steel and aluminum alloys), namely in materials suitable to withstand to the stress deriving from their use and from the fact of being exposed, most of times, to atmospheric agents, are generally bound to the chassis of tractors or of trailers, below or above the load bed, or more generally to all dynamic or static devices, by means of removable connections, which include at least two brackets to which the box is engaged, mostly by bolts.

The known mounting systems for toolboxes and boxes in general have a number of drawbacks and problems, among which the most important is the need to drill, during installation, the walls of the box to allow the passage of the pins to be engaged with the brackets, said brackets being, in turn, bound to the vehicle chassis or to the structure in general, after their drilling by means of bolted connections or, otherwise, directly welded to the same.

This way of proceeding, makes the installation of the toolboxes and boxes in general difficult, and involves not only a considerable waste of time, but also the need to make use of qualified personnel. In addition, making holes to the boxes may compromise their water tightness.

A further drawback of the known mounting systems, is in the case in which the toolbox needs to be disassembled and replaced with a larger one or because it is damaged as a result of a road accident or simply because it requires maintenance. Disassembling operations of a box from a chassis, in addition to requiring long times, require the use of appropriate tools to remove the bolts, which, most of times, are subject to rust and/or oxidation, from the box.

The present invention aims to allow the connection of toolboxes and boxes in general to a vehicle chassis or to a structure in general, through a quick-connection mounting system, which allows to speed up the mounting and disassembling operations without the need to make use of qualified personnel.

A further aim of the present invention is to provide with a connection system of toolboxes and boxes in general, to a vehicle chassis or to a structure in general, which does not imply drilling the walls of the box and therefore may guarantee its water tightness.

Figure 2:
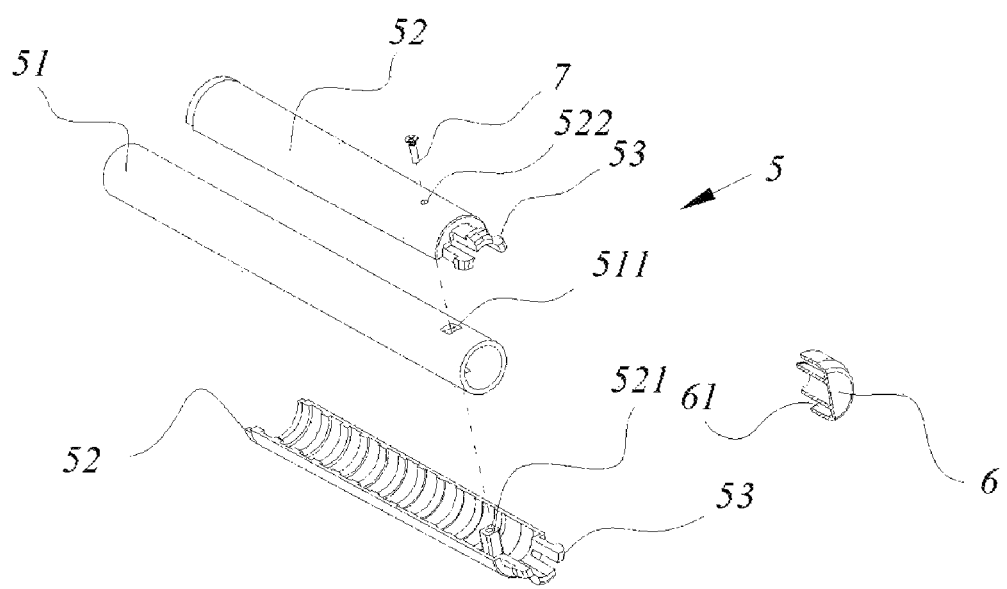
Figure 3:
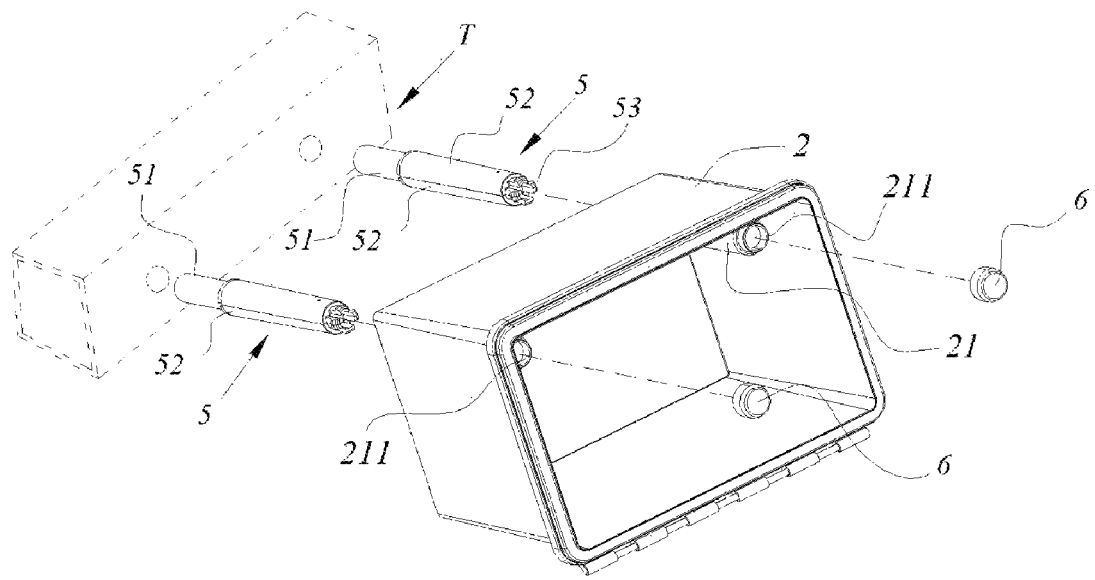
Figure 4:
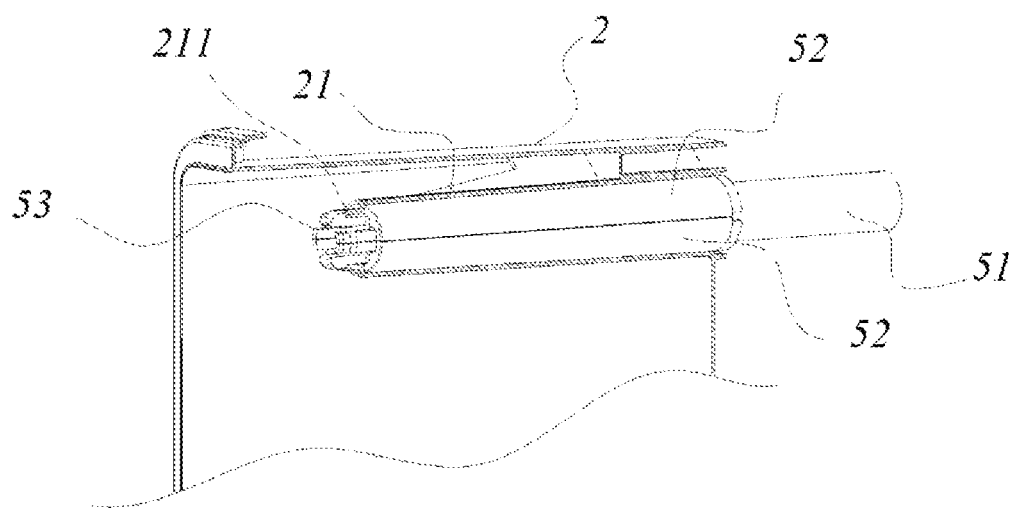
Figure 5:
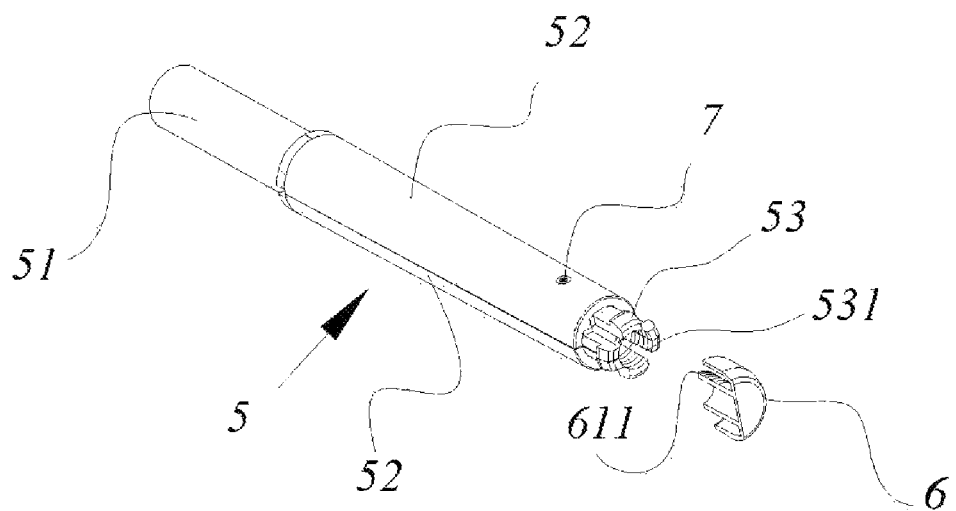

These aims are achieved by the quick-connection mounting system for the automotive sector and boxes in general, according to the present invention, hereinafter described, in a preferred embodiment non-limiting of further developments in the field of the patent, with the help of the attached drawings illustrating the following figures:

FIG. 1, is an isometric view of a generic box where part of the door is partially removed;
FIG. 2, is an exploded view of the connection system;
FIG. 3, is an exploded isometric view of the box and of the quick-connection mounting system;
FIG. 4, is a sectional view of the connection system and the correspondent truncated-conical housing;
FIG. 5, is an isometric view of the connection system and the cap, in the form of a screw.

An example of box to be mounted on a vehicle chassis or on a dynamic or static device, equipped with a quick-connection mounting system, according to the present invention, is hereinafter indicated with the number 1.

The box 1 consists of a prismatic-shaped container 2 provided with a door 3, bound to the box by means of a simple hinge 11, and by a mechanical lock 4 controlled by a handle 41, able to allow the opening of the box 1 only by its user/owner.

As shown in FIGS. 3 and 4, the quick-connection system, according to the present invention, comprises at least one bracket 5 to be bound, by one of its ends, to an industrial vehicle chassis or, more generally, to a dynamic or static device, and at least a tubular housing 21, of suitable shape to be engaged with the at least one bracket 5, said housing 21v formed inside the prismatic-shaped container 2.

As shown in FIG. 2, each truncated-conical bracket 5 is formed of a tubular 51, and of two specular half-shells 52 characterized in that its length is equal to the conical tubular housings 21 depth and in that said half-shells 52 are equipped, at their ends, with an elastic blocking device 53, suitable to be mechanically engaged, by elastic deformation, to the open ends 211 of the conical tubular housings 21.

Said half-shells 52 being characterized in that they can be bound to said tubulars 51, through a simple mechanical interlocking realized by a through cavity 511 formed close to the end not bounded to the chassis T of the tubular 51, in which a prismatic semi-wedge 521 is engaged, formed within each half-shell 52, so that, in this way, the two specular half-shells 52, once engaged each in the correspondent cavity 511 of the tubulars 51, contribute to realize the whole truncated-conical bracket 5. A screw 7 or other equivalent retention system, will contribute to maintain stable the union of the two half-shells 52.

The screw 7 or other equivalent system will also have a structural safety function together with the prismatic wedge 521 preventing accidental loads from tearing off said prismatic wedge 521 causing the accidental detachment of the box 1.

The tubulars 51 are, in turn, bound to the chassis T through common connection means. When the half-shells 52 are connected to the tubulars 51, in order to form the whole truncated-conical brackets 5, it is possible to mount the box 1 by sliding the truncated-conical brackets 5, within the conical tubular housings 21.

During the stroke of the truncated-conical brackets 5, within the conical tubular housings 21, the elastic blocking device 53, at the end of the bracket 5, undergoes an elastic contraction that ends only when the truncated-conical brackets 5 end their stroke. The elastic blocking device 53, placed at the end of the truncated-conical brackets 5, coming out from the open end 211 of the correspondent conical tubular housing 21, and activating itself on the open end 211 allows to fix the position of the box 1.

After the elastic blocking device 53, of the truncated-conical brackets 5 comes out from the open end 211 of the conical tubular housings 21, it is closed with a cap 6 which, beyond guaranteeing water tightness, has the purpose of helping to maintain the resting position of the elastic blocking device 53, by means of a cylindrical collar 61, formed within the same cap 6, which engages within the elastic blocking device 53, blocking its elastic deformation.

As shown in FIG. 5, the cap 6 has a knurl 611, which allows it to be fitted in the blocking device 53 which, to this purpose, has a counter internal knurl 531.

In order to disengage the box from the truncated-conical brackets 5, it is sufficient to remove the caps 6, by applying an adequate extraction force to overcome the knurl resistance, and deform, inwards, the elastic blocking device 53, and extract the box 1 by disengaging the truncated-conical brackets 5 from the housings 21.

In a preferred embodiment, the elastic blocking device 53 consists of at least two diametrically arranged toothed resilient tongues 53, suitable for mechanical engagement of each conical tubular housing 21 at the open end 211.

The invention claimed is:

1. Quick-connection mounting system for the automotive sector and boxes in general, comprising a prismatic container, a lockable door, secured to said prismatic container by means of a hinge, at least two truncated-conical brackets, secured, at one end, to the chassis of a vehicle, wherein the prismatic container comprises at least two conical tubular housings, suitable to be mutually engaged with said at least two truncated-conical brackets, each of said truncated-conical brackets being formed of a tubular, two specular half-shells able to engage with said tubular, each half-shell comprising, at an end, an elastic blocking device of the at least two truncated-conical brackets inside the at least two conical tubular housings.

2. Quick-connection mounting system for the automotive sector and boxes in general, according to claim 1, wherein, if matched, the half-shells provide the truncated-conical bracket with a specular surface equivalent to the conical tubular housing.

3. Quick-connection mounting system for the automotive sector and boxes in general, according to claim 1, wherein the two half-shells are mutually engaged by means of a semi-wedge, located at an inner end of each half-shell, suitable to be engaged inside a through cavity formed at one end of the tubular, and by a screw, engaged in its turn to said semi-wedge, after passing through a hole created at the end of the half-shell.

4. Quick-connection mounting system for the automotive sector and boxes in general, according to claim 1, wherein the elastic blocking device is formed of at least two toothed resilient tongues, diametrically arranged, suitable to be mechanically engaged with an outer edge of each conical tubular housing.

5. Quick-connection mounting system for the automotive sector and boxes in general, according to claim 1, wherein a watertight cap embeds the elastic blocking device.

6. Quick-connection mounting system for the automotive sector and boxes in general, according to claim 5, wherein the cap is equipped with a cylindrical collar, suitable to be engaged inside the elastic blocking device to prevent its deformation.

7. Quick-connection mounting system for the automotive sector and boxes in general, according to claim 5, wherein the cap is equipped with an externally-knurled collar, suitable to be engaged with a corresponding knurled edge obtained inside the elastic blocking device to tightly engage the cap with the elastic blocking device.

\* \* \* \* \*